United States Patent [19]
Fisher et al.

[11] Patent Number: 5,632,949
[45] Date of Patent: May 27, 1997

[54] RECYCLABLE MOLDED HIGH MODULUS FIBER REINFORCED THERMOPLASTIC STRUCTURES AND PROCESS FOR PREPARING THE SAME

[75] Inventors: John M. Fisher, Newark; Edward Hatchadoorian, Wilmington, both of Del.

[73] Assignee: E. I. Du Pont de Nemours and Company, Wilmington, Del.

[21] Appl. No.: 590,959

[22] Filed: Jan. 24, 1996

Related U.S. Application Data

[63] Continuation of Ser. No. 284,468, filed as PCT/US92/01391, Feb. 21, 1992, abandoned.

[51] Int. Cl.$^6$ ................................................ B28B 7/22
[52] U.S. Cl. ........................ 264/255; 264/258; 428/360; 428/902; 442/381; 442/415
[58] Field of Search ............................ 264/255, 258; 428/288, 284, 360, 902

[56] References Cited

U.S. PATENT DOCUMENTS

| | | | |
|---|---|---|---|
| 4,081,578 | 3/1978 | Essin et al. | 428/63 |
| 4,189,517 | 2/1980 | Shanoski et al. | 428/423 |
| 4,457,797 | 7/1984 | Hatchadoorian et al. | 156/242 |
| 4,716,072 | 12/1987 | Kim | 428/212 |
| 4,737,403 | 4/1988 | Simpson et al. | 428/273 |
| 4,781,876 | 11/1988 | Kim | 264/261 |
| 4,948,661 | 8/1990 | Smith et al. | 428/286 |
| 4,983,247 | 1/1991 | Kim | 156/272.2 |
| 5,006,188 | 4/1991 | Usui et al. | 156/245 |
| 5,009,821 | 4/1991 | Weaver | 264/22 |
| 5,134,016 | 7/1992 | Geary, Jr. et al. | 428/198 |

FOREIGN PATENT DOCUMENTS 372740  11/1989  European Pat. Off. .

*Primary Examiner*—James J. Bell
*Attorney, Agent, or Firm*—Rodney B. Carroll

[57] ABSTRACT

A process is provided for preparing recyclable reinforced composite structures having enhanced surface appearance by heating a self-supporting porous batt comprised of an intimate homogenous blend of high modulus reinforcing fibers and thermoplastic resin fibers to a temperature sufficient to melt the resin component and convert the batt into moldable form, placing the moldable batt into a heated mold to flow, solidify and substantially crystallize the component, introducing a thermosetting resin-containing coating material into the mold adjacent at least one surface of the crystallized structure to provide a coating on the one surface and dwelling the coated structure in the mold for a time sufficient to set the coating material.

4 Claims, 1 Drawing Sheet

1

RECYCLABLE MOLDED HIGH MODULUS FIBER REINFORCED THERMOPLASTIC STRUCTURES AND PROCESS FOR PREPARING THE SAME

This is a continuation of application Ser. No. 08/284,468 filed as PCT/US92/01391 Feb. 21, 1992, now abandoned.

FIELD OF THE INVENTION

The present invention relates to providing recyclable high modulus fiber reinforced composite structures having an enhanced surface appearance.

BACKGROUND OF THE INVENTION

The use of plastic components in combination with metal parts is common in the production of automobiles. Mixtures of resins and reinforcing materials are used as sheet molding compounds, SMCs, which are molded to form various shaped articles. Generally in applications requiring high quality painted surfaces, highly filled thermosetting SMCs have been used.

A long standing problem in providing reinforced composite structures resides in manufacturing structures which when painted provide a Class A finish. These structures such as automotive body panels must be capable of being processed in assembly plants with steel panels. They must be able to survive assembly plant conditions, painting and baking, where maximum metal temperatures can reach 200° C. for as long as 30 minutes with surface coatings remaining firmly adhered to the substrate and retaining their Class A appearance. The body panels must have, after processing, an appearance that is comparable to the appearance of an adjoining pan made of steel. They must also have acceptable dimensional stability in order to maintain the highest quality fit and finish over wide temperature extremes found in various geographical market segments. When using SMCs, surface appearance problems such as "paint pops" occur due to emission of low molecular weight monomers in the thermosetting substrate. In addition an ever increasing concern is whether the material is readily recyclable during manufacture and in post manufacture use. For example, can the resin component be remelted or depolymerized. The thermosetting SMCs are not recyclable in the sense that they cannot be remelted or depolymerized.

SUMMARY OF THE INVENTION

The products of this invention which solve the problems noted above are made by preparing composite structures comprised of a substrate prepared from a plurality of layers of a self-supporting porous web comprised of randomly dispersed high modulus reinforcing fibers held together by solidified thermoplastic resin. The layers are heated to provide a premold form which is then placed in a mold to flow, solidify, and crystallize the thermoplastic resin. The resulting reinforced thermoplastic substrate is coated in the mold with a thin coating of a thermosetting resin-containing composition.

In preparing the composite structures of the invention, the layers of porous web are stacked together to form a batt which is heated in a convection oven to convert the batt into a moldable form. The number of layers is determined by weighing the precut shapes to provide a predetermined mold charge mass which is based on the final desired molded part thickness. The moldable form is then placed in a heated mold. The mold is closed and pressure is applied to flow

2 mold the preform to form a consolidated part and to crystallize the thermoplastic resin component. Upon completion of the molding operation, the mold halves are separated and/or the pressure is released to permit introduction of a thermosetting resin-containing coating material. The mold is then closed, and under pressure, the material spreads over the surface of the molded preform. Heating under pressure is continued for a time sufficient to set the coating composition. Surprisingly, the thermosetting composition adheres tenaciously to the reinforced molded thermoplastic substrate and exhibits outstanding surface appearance.

The batts used to prepare the preforms are comprised of from 5 to 50 percent by weight glass fibers and from 50 to 95 percent by weight thermoplastic resin. The batts are air permeable and are made from air permeable webs of randomly dispersed high modulus fibers held together at fiber crossover locations by solidified globules of thermoplastic resin enveloping the fibers at the crossover locations. Some of the randomly dispersed fibers have bead-like drops of solidified thermoplastic resin adhered thereto at locations along their length at locations other than at crossovers. The preparation of such webs is disclosed in Geary and Weeks U.S. patent application Ser. No. 07/606,651, filed Oct. 31, 1990 and European Patent Application 0 341 977, published Nov. 15, 1989.

The products of this invention are composite structures which are warp-free, have very smooth surfaces and exhibit excellent physical properties. The thermosetting resin-containing surface coating strongly adheres to the reinforced molded thermoplastic substrate surface. When the structures are used in automotive body panels and painted, the painted surface is rated Class "A". The quality of the surface coating can be measured using a commercially available distinctness of image (DOI) meter. Reflected light intensity from a photo detector is measured as a function of the scattering angle. If the scattering function is short and wide, the surface is said to have a low DOI. If the scattering is limited, the surface has a high DOI. DOI meters detect the reflected light in a region slightly away from the spectral angle. If the light detected is small, the distinctness is high. DOI is measured on a scale from 0 to 100 with 100 being the highest level of smoothness.

Painting procedures which are well known in the art may be used with the structures of this invention. They may be painted side by side with steel parts. For example, the surfaces may be primed and topcoated, or optionally a basecoat/clear coat finish may be applied. When placed in a drying oven after being painted, no "paint pops" occur whereas in using SMCs, due to emission of low molecular weight monomers, "paint pops" are encountered.

DETAILED DESCRIPTION OF THE INVENTION

Figure 1:
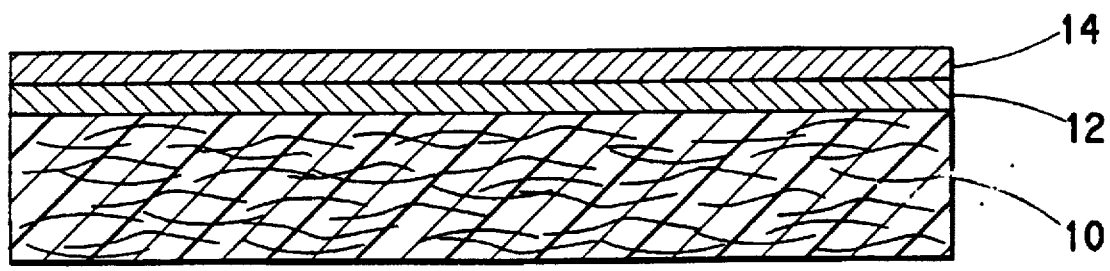
FIG. 1 is a schematic illustration of a cross section of a composite structure produced by the process of this invention.

Referring to the drawing, FIG. 1 shows reinforced thermoplastic substrate 10 which has been coated with thermosetting resin-containing coating 12. The resulting composite part is coated with multiple layers of paint 14.

In carrying out the process of the invention, a porous butt is formed from an intimate homogenous blend of reinforcing fiber and thermoplastic resin fiber components. The reinforcing fiber may be any high modulus fiber, such as polyamides, glass, carbon, polyesters and high temperature nylons. A modulus of at least 100,000M Pascals is preferred. The reinforcing fibers may be of consistent length or a mixture of variable length fibers. Generally, long fibers in the range of one to eight centimeters are preferred.

The thermoplastic resin fibers may be any thermoplastic or combination of several suitable thermoplastics for the application. Examples of suitable thermoplastics include, but are not limited to, polyethylene, polypropylene, polyesters, copolyesters, polyamides, including Nylon 6, Nylon 6/6, Nylon 11, Nylon 12, and J2, polyetheretherketone (PEEK), polyetherketoneketone (PEKK), polymethylphenylene, polyarylates and polyvinylidene fluoride. The denier and length of the thermoplastic fiber is chosen such that the volume of a single fiber is within a range, preferably between $1.5 \times 10^{-4}$ to $10 \times 10^{-3}$ mm$^3$ which when heated results in a globule volume in the range of approximately $0.5 \times 10^{-4}$ to $1 \times 10^{-3}$ mm$^3$. Given the volume range, the thermoplastic fiber diameter is generally chosen based on economic considerations. For instance, the most economical polyester staple is 1.5 denier per filament (DPF). In general, a length of 1–50 mm and DPF of greater than 0.5 is preferred.

An intimately blended web is formed from the high modulus and thermoplastic fibers. The basis weight of the formed web is in the range of 0.05–0.2 pounds per square foot (0.244–0.98 kg/sq m). The formed web is passed through a convection heating oven to dry and melt the thermoplastic fiber forming globules which bond the structure together. This melting step produces a web of substantial strength sufficient for normal web handling and is critical to obtaining a web that has the high porosity desired for subsequent convection heating in preparation for molding.

The thermosetting resin-containing coating compositions are unsaturated resins which are rendered insoluble and infusible by cross-linking. Such resins are well known in the art and can be of the type disclosed by Sorenson and Campbell in Chapter 7, "Synthetic Resins", published by INTERSCIENCE PUBLISHERS, INC., New York, 1961. Examples include polyester/acrylic/vinyl monomer resins. The various combinations of polyester, acrylic and vinyl monomers are very great. Also various alkyd and unsaturated polyester resins described in MODERN PLASTICS ENCYCLOPEDIA, 1989 Edition,published by Mc Graw Hill, New York, may be used.

The thermosetting coating compositions can be filled or compounded to give the desired viscosity and flow characteristics for molding and to afford the desired physical properties in the resulting coating. Examples of such fillers or compounding ingredients are fillers like clay, talc, magnesium oxide, magnesium hydroxide, calcium carbonate and calcium silicate, mold release agents, colorants such as red iron oxide, titanium oxide, carbon black, organic color pigments such as phthalocyanine blue or green, antidegradants, UV absorbers, calcium silicate, hollow glass or resin micro-spheres, thickening agents, inhibitors and the like. Care should be exercised in the use of high filler contents as this may give high viscosities and result in flow and handling difficulties.

A preferred thermosetting resin-containing composition consists of a styrene containing modified acrylic resin mixture which is sold by GenCorp Inc. under the trademark Genglaze®.

A preferred reinforcing fiber used in the invention is glass fiber which consists of conventional spun glass strand having a diameter between 5 and 50 microns and a cut length of 1 to 8 cm. As is common in the industry, such glass is sized and chopped to length and shipped "wet" in moisture proof containers to the customer. A preferred material is that sold by Owens-Corning Fiberglass (OF) under the label 133A.

The preferred molding method for practicing the invention is compression molding. A stack of sheets are layered together. The stack is placed in a forced air convection oven and heated above the melting point of the thermoplastic resin component for less than one minute. The heated preform is then placed in a compression mold where the tool temperature is adjusted to a temperature to crystallize the thermoplastic resin component. Sufficient pressure is applied to flow mold the preform to fill out the mold. After a dwell time of preferably 30 to 60 seconds the mold is opened. As soon as possible after opening the mold, a thermosetting resin-containing component is introduced into the mold in an amount sufficient to create a layer from 3 to 10 mils (0.076 to 0.254 mm) thick over the upper surface of the preform. The coated structure is held in the mold under pressure for a time sufficient to cure the thermosetting resin-containing component. The coated structure is permitted to cool sufficiently for handling and is then removed from the mold.

In compression molding the mold must be opened enough to place the charge of coating composition in the mold on the surface to be coated. In another type of molding, such as injection molding, the mold is opened enough to insert the charge means, i.e. opening it by an amount equal to the desired thickness of the coating, to permit injection of the component, or injection may be made against the pressure in the mold.

In a preferred embodiment of the process of this invention, a porous web of the type described above comprised of glass fiber and polyethylene terephthalate (PET) fiber is precut into a predetermined shape. Several layers of the precut material, (15–25 layers) are stacked together to make up a molding Charge. The molding charge is then placed in a specially designed convection oven where the thermoplastic resin is remelted. The preheating is accomplished with an air temperature of from 285°–320° C. and requires 30–90 seconds. The flow (velocity) of heated air through the charge is in the range from 150 to 400 feet per minute (45.72 to 121.92 meters per minute) which for an average thickness mold charge will create a pressure drop through the thickness of the charge of less than 7 inches of water.

After the resin is remelted, the molding charge is removed from the oven and placed in a compression mold. The mold surface temperature is typically between 150°–175° C. when using polyethylene terephthalate resin. The charge size is typically between 40 and 100% of the planform area of the pan to be molded. As the mold closes on the molding charge, a tool pressure of 2000 psi (13.8M pascals) or greater should be achieved which is typically maintained through the duration of the part forming step. Mold dwell is typically 30–60 seconds depending on the thickness of the part.

Upon completion of the part forming step, surface enhancement is achieved through use of in-mold-coating using a thermosetting resin-containing material. As disclosed above, the coating can be done manually or by automated injection.

In the manual operation, the mold halves are separated upon completion of the part forming process. It is essential at this stage that the surface of the molded part be free of debris, e.g. molding flash. The in-mold coating is premixed with a catalyst and then poured onto the part surface to be coated. The amount of coating used is typically 0.06 to 0.22 grams per square inch (0.0093 to 0.0341 gm/sqcm) of part surface to be coated. This will give a coating thickness from 3 to 10 mils (0.076 to 0.254 mm). The mold is then closed, and a tool pressure of not more than 1000 psi (6.9M pascals), 500–800 psi is optimal, (3.5M–5.5M pascals) is achieved. This tool pressure flows the in-mold coating over the surface of the molded part. The mold dwell is 15–60 seconds depending on the particular coating system used. The mold is then opened, and the part is removed.

The composite part can be assembled with steel parts and painted using well known procedures. Among the many suitable paint compositions which may be used are those disclosed in U.S. Pats. No. 4,816,500, U.S. Pat. No. 4,954, 559 and U.S. Pat. No. 5,051,209.

In the automated process, upon completion of the part forming step, the pressure is relieved, and the mold halves are separated slightly. Precatalyzed coating composition is then injected through an injector port across the surface of the tool. Again, the same rule for the amount of coating applies. Immediately after injection, the mold is closed to a tool pressure of not more than 1000 psi (6.9M pascals), and the mold dwell time is again 15–60 seconds depending on the particular type of coating composition used. The mold is then opened and the part removed.

The process of the invention can be used to mold automobile pans such as grille and headlamp assemblies, deck hoods, fenders, door panels and roofs as well as in the manufacture of various plastic articles such as food trays, appliance and electrical components and in other applications where surface smoothness is required for subsequent application of paint.

The in-mold-coated products of this invention are recyclable. The properties of recovered thermoplastic products are not adversely affected by the presence of the thermosetting resin-containing coatings.

The invention will be further illustrated by the following examples in which parts and percentages are by weight unless otherwise indicated. Units reported throughout the specification and claims in SI units have been converted from the English system to the SI System.

EXAMPLES

EXAMPLE 1

A self-supporting porous batt was prepared from polyethylene terephthalate fiber (PET) having an as spun denier of 1.5. The fiber was coverted to a staple length of ¼ inch (0.635 cm) and intimately mixed with 1 inch long glass fiber having a diameter of about 0.5 rail (0.013 mm). The above ingredients were slurried in water and directed to a moving belt from a paper machine head box, then to a dryer. The mat consisted of 40.7 Wt. % glass fiber (Owens Corning Fiberglass "K") 57.2 Wt. % PET fiber and 9.1 Wt. % of a lower melting copolyester binder fiber. Ciba Geigy's antioxidant, Irganox®1010, was added to the slurry in an amount of 1.0 Wt. %. A belt speed of 22 fpm (6.71 mpm) and heater temperature of 195° C. was used to partially melt the PET fiber. A batt having a basis weight of about 0.171 lb/sqft (8.35 kq/sqcm) and a consistency of 0.54 Wt. % was obtained.

The batt was placed in a convection oven and heated at a temperature of 285° C. for 30 seconds while circulating hot air through the batt at about 350 feet per minute (106.68 m/min) to melt the PET component. The batt was then placed in a compression mold for 1 minute at a temperature of 150°–180° C. to crystallize the structure. Mold pressure was controlled at between 1,500 and 2,500 psi (10.34 and 17.24M pascals). The mold was opened to expose the exterior surface of the molded structure.

As soon as possible after opening the mold, a thermosetting styrene containing modified acrylic resinous coating material sold by GenCorp Inc. under the trademark GENGLAZE® EC 600 was applied to the exposed surface of the molded structure in an amount of 0.14 gram/square inch (217.95 gn/sqm) The mold was reclosed under partial vacuum at a lower pressure of about 200 to 1000 psi (1.4 to 6.9M pascals) to distribute the coating material over the surface of the molded structure. After 60 seconds, the mold was opened and the coated structure was removed. The coating was uniformly distributed, having a thickness of 6 mils, with a very smooth surface.

EXAMPLE 2

The procedure described in Example 1 was repeated except that the glass fiber content of the batt was reduced to 25 wt. %, no binder fiber was used, the polyethylene terephthalate fiber content was increased to 75 wt. % and Ciba Geigy's antioxidant, Irganox®1330, was used in an amount of 0.25 wt. %, the belt speed was increased to 25 fpm (7.62 m/m) and the heater temperature was increased to 280° C. The sheet, having a basis weight of 0.091 lb/sqft (0.444 kg/sqm).

A clicker die was used to convert the rolled batt into a form suitable for thermal compression molding. A preform consisting of twenty (20) sheets stacked as a batt gave a part weight of about 1.0 to 1.5 lbs/sqft (0.488 to 0.732 gm/sqcm) on thermal compression molding.

Before thermal compression molding, the batt was placed in a convection oven and hot air was circulated through the batt at about 350 ft/min (106.68 m/min) for 30 seconds at 285° C. to convert the porous batt into a moldable form. The pliable melt was placed into a mold for one minute at a mold temperature of 150° to 180° C. to produce a crystallized structure. The mold pressure was controlled at 2000 psi (13.8M pascals).

As soon as possible after opening the mold, a resinous coating material consisting of GENGLAZE® EC 600 was applied to the exposed surface of the molded structure in an amount of 0.14 grams/sq inch (217.95 gn/sqm). The mold was reclosed under partial vacuum at a lower pressure of about 200 to 1000 psi (1.4 to 6.9M pascals) to distribute the coating material over the surface of the molded structure. After 60 seconds the mold was opened, and the coated structure was removed. The coating had a thickness of 6 mils (0.152 mm) A very smooth coated surface was obtained.

Products prepared by the process of this invention were tested using a Bendix Surface Profilometer, Model No. 21, stylus head Bendix T-231 and probe diameter of 0.0004 inch (0.01016 mm) to determine the surface roughness. Products of this invention were found to have a maximum surface roughness deviation of less than 50 micro-inches (0.00127 mm) over a 0.25 inch (6.35 mm) span.

Adhesion of the thermosetting resin-containing coating to tie thermoplastic substrate was tested using an Instron tensile tester. Two metal cylinders having a diameter of 1.596 inches (4.05 cm).2 sq inches surface area.(12.9 sqcm) were bonded using Dexter Hysol® adhesive, EA934NA, a two part part adhesive, to each side of a test sample. When the adhesive was cured, the pieces were pulled apart in the Instron tester. The test samples were prepared by the process described in the Examples. The results of the tests are set forth in the following Table:

| MATERIAL | STRENGTH (psi) | (M pascals) | TYPE OF FAILURE |
|---|---|---|---|
| Sample 1 | 2452 | 16.9 | Coating separated from the substrate |
| Sample 2 | 2379 | 16.4 | Coating separated from the substrate |
| Sample 3 | 2810 | 19.4 | Delamination of the substrate |
| Sample 4 (Painted) | 2480 | 17.1 | Delamination of the Substrate |

For purposes of defining this invention, the term "adhesion value means the tensile strength of the bond between the surface coating and the substrate as measured using an Instron tensile tester, Model No.1127, using a 25,000 kg reversible load cell, or equivalent, and reported in psi (pascals). Products of this invention have adhesion values greater than 1000 psi (6.9M pascals). This adhesion value must be attained to provide an acceptable product which is useful in industry applications. In conducting tests to determine adhesion values any suitable adhesive which has a bonding strength greater than the force required to delaminate the substrate may be used.

We claim:

1. A process for preparing a recyclable reinforced composite structure having enhanced surface appearance comprising a) heating a bait comprised of a plurality of layers of a self-supporting porous web comprised of randomly dispersed high modulus reinforcing fiber held together by solidified thermoplastic resin to convert the bait into a moldable form;

b) placing the moldable form into a heated mold and flowing said moldable form under pressure to substantially crystallize the thermoplastic resin component;

c) introducing a thermosetting resin-containing coating material into the mold adjacent at least one surface of the crystallized structure by separating the sections of said mold and closing said heated mold under pressure to provide a substantially uniform coating on said one surface, d) dwelling the coated structure in the mold for a time sufficient to set said coating material, and e) recovering a molded pan having an enhanced surface appearance.

2. The process of claim 1 wherein said thermoplastic resin is a polyester.

3. The process of claim 1 wherein said high modulus reinforcing fiber is glass fiber comprising from 5 to 50 percent by weight of said moldable form.

4. The process of claim 3 wherein said glass fiber has a length from 1 to 10 cm and a diameter from 5 to 50 microns and said thermoplastic resin is polyethylene terephthalate.

* * * * *

UNITED STATES PATENT AND TRADEMARK OFFICE
CERTIFICATE OF CORRECTION

PATENT NO. : 5,632,949

DATED : MAY 27, 1997

INVENTOR(S) : JOHN M. FISHER
EDWARD HATCHADOORIAN

It is certified that error appears in the above-identified patent and that said Letters Patent is hereby corrected as shown below:

Claim 1 a), line 1, change "bait" to —batt—

Claim 1 a), line 4, change "bait" to —batt—

Claim 1 d), line 18, change "pan" to —part—

Signed and Sealed this

Ninth Day of September, 1997

Attest:

BRUCE LEHMAN

Attesting Officer

Commissioner of Patents and Trademarks